United States Patent
Mohen et al.

(10) Patent No.: US 12,088,656 B2
(45) Date of Patent: *Sep. 10, 2024

(54) METHOD AND SYSTEM FOR ENFORCING GOVERNANCE ACROSS MULTIPLE CONTENT REPOSITORIES USING A CONTENT BROKER

(71) Applicant: OPEN TEXT CORPORATION, Waterloo (CA)

(72) Inventors: Michael T. Mohen, Columbia, MD (US); Raman Walia, Pleasanton, CA (US); Chandra Mouli Addaguduru, Bangalore (IN); Pardeep Kumar, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,579

(22) Filed: Sep. 29, 2023

(65) Prior Publication Data

US 2024/0031422 A1   Jan. 25, 2024

Related U.S. Application Data

(63) Continuation of application No. 18/158,084, filed on Jan. 23, 2023, now Pat. No. 11,811,851, which is a continuation of application No. 16/913,899, filed on Jun. 26, 2020, now Pat. No. 11,570,229, which is a continuation of application No. 16/397,802, filed on Apr. 29, 2019, now Pat. No. 10,742,771, which is a continuation of application No. 14/870,986, filed on Sep. 30, 2015, now Pat. No. 10,362,146.

(51) Int. Cl.
*H04L 67/01* (2022.01)
*H04L 67/02* (2022.01)
*H04L 67/564* (2022.01)

(52) U.S. Cl.
CPC .............. *H04L 67/01* (2022.05); *H04L 67/02* (2013.01); *H04L 67/564* (2022.05)

(58) Field of Classification Search
CPC ........ H04L 67/564; H04L 67/01; H04L 67/02
See application file for complete search history.

(56) References Cited

U.S. PATENT DOCUMENTS

| | | | | |
|---|---|---|---|---|
| 7,613,676 | B2* | 11/2009 | Baisley | G06Q 10/10 715/201 |
| 7,647,387 | B2* | 1/2010 | Bellare | G06F 16/958 209/217 |
| 7,849,282 | B2* | 12/2010 | Nonaka | G06F 3/0643 711/165 |

(Continued)

*Primary Examiner* — Mahran Y Abu Roumi
(74) *Attorney, Agent, or Firm* — Sprinkle IP Law Group

(57) ABSTRACT

A method and system for a content broker, including a unified object index, where the content broker is coupled to the unified object index and receives, from a requesting entity, a request to perform an action on an object and the object is stored in the content repository. The method further including obtaining the object associated with the request from a content repository, determining, using the unified object index, a normalized object type associated with the object, obtaining a governance rule based on the normalized object type, and servicing the request using the governance rule.

17 Claims, 7 Drawing Sheets

(56) References Cited

U.S. PATENT DOCUMENTS

| | | | | |
|---|---|---|---|---|
| 8,516,362 B2* | 8/2013 | Scoda | G06F 40/151 | 715/239 |
| 8,521,766 B1* | 8/2013 | Hoarty | G10L 15/08 | 707/769 |
| 9,641,879 B2* | 5/2017 | Kocks | H04N 21/251 | |
| 10,176,242 B2* | 1/2019 | Shams | G06F 16/235 | |
| 11,023,830 B2* | 6/2021 | Sao | G06Q 10/06 | |
| 2001/0047385 A1* | 11/2001 | Tuatini | H04L 67/01 | 709/219 |
| 2003/0028447 A1* | 2/2003 | O'Brien | G06Q 30/0603 | 718/100 |
| 2003/0220890 A1* | 11/2003 | Okude | G06N 5/04 | 706/50 |
| 2006/0026576 A1* | 2/2006 | Baisley | G06F 8/10 | 717/143 |
| 2007/0038822 A1* | 2/2007 | Correl | G06F 11/1466 | 711/162 |
| 2007/0192431 A1* | 8/2007 | Liu | H04L 67/565 | 709/217 |
| 2008/0091840 A1* | 4/2008 | Guo | H04L 67/1023 | 709/231 |
| 2010/0145917 A1* | 6/2010 | Bone | G06F 16/185 | 709/201 |
| 2010/0149583 A1* | 6/2010 | Tian | H04L 67/02 | 358/1.15 |
| 2011/0016091 A1* | 1/2011 | Prahlad | G06F 11/1453 | 707/654 |
| 2011/0016348 A1* | 1/2011 | Pace | H04L 67/10 | 714/25 |
| 2011/0145249 A1* | 6/2011 | Joshi | G06F 16/81 | 707/738 |
| 2011/0282793 A1* | 11/2011 | Mercuri | G06Q 30/0222 | 705/347 |
| 2012/0084583 A1* | 4/2012 | Chen | G06F 16/258 | 713/320 |
| 2013/0007511 A1* | 1/2013 | Gaertner | G06F 11/1092 | 714/6.22 |
| 2013/0019282 A1* | 1/2013 | Rice | H04L 69/18 | 726/4 |
| 2013/0159530 A1* | 6/2013 | James | G06F 16/9566 | 709/226 |
| 2013/0179560 A1* | 7/2013 | Kumar | G06F 11/302 | 709/224 |
| 2013/0332818 A1* | 12/2013 | Speek | G06F 40/00 | 715/234 |
| 2013/0347056 A1* | 12/2013 | Kuhlman | H04L 9/40 | 726/1 |
| 2014/0040286 A1* | 2/2014 | Bane | G06F 16/178 | 707/754 |
| 2014/0136898 A1* | 5/2014 | McKiou | H04L 41/0654 | 714/E11.021 |
| 2014/0189056 A1* | 7/2014 | St. Clair | H04L 67/55 | 709/217 |
| 2014/0282796 A1* | 9/2014 | Walker | H04N 21/4622 | 725/116 |
| 2014/0365794 A1* | 12/2014 | Decker | G06F 1/3246 | 713/320 |
| 2015/0100406 A1* | 4/2015 | Klimetschek | G06Q 30/0242 | 705/14.41 |
| 2015/0229538 A1* | 8/2015 | Burke | H04L 47/2433 | 709/225 |
| 2016/0006829 A1* | 1/2016 | Ishii | G06F 3/067 | 709/219 |
| 2016/0078361 A1* | 3/2016 | Brueckner | H04L 67/10 | 706/12 |
| 2016/0103838 A1* | 4/2016 | Sainani | G06F 16/24 | 707/725 |
| 2017/0019487 A1* | 1/2017 | Maheshwari | H04L 67/51 | |
| 2017/0262549 A1* | 9/2017 | James | G06F 16/9566 | |
| 2017/0308559 A1* | 10/2017 | Shams | G06F 16/235 | |

* cited by examiner

METHOD AND SYSTEM FOR ENFORCING GOVERNANCE ACROSS MULTIPLE CONTENT REPOSITORIES USING A CONTENT BROKER

CROSS-REFERENCE TO RELATED APPLICATIONS

This application is a continuation of, and claims a benefit of priority under 35 U.S.C. § 120 from, U.S. patent application Ser. No. 18/158,084, filed Jan. 23, 2023, entitled "METHOD AND SYSTEM FOR ENFORCING GOVERNANCE ACROSS MULTIPLE CONTENT REPOSITORIES USING A CONTENT BROKER," which is a continuation of, and claims a benefit of priority under 35 U.S.C. § 120 from, U.S. patent application Ser. No. 16/913,899, filed Jun. 26, 2020, issued as U.S. Pat. No. 11,570,229, entitled "METHOD AND SYSTEM FOR ENFORCING GOVERNANCE ACROSS MULTIPLE CONTENT REPOSITORIES USING A CONTENT BROKER," which is a continuation of, and claims a benefit of priority under 35 U.S.C. § 120 from, U.S. patent application Ser. No. 16/397,802, filed Apr. 29, 2019, issued as U.S. Pat. No. 10,742,771, entitled "METHOD AND SYSTEM FOR ENFORCING GOVERNANCE ACROSS MULTIPLE CONTENT REPOSITORIES USING A CONTENT BROKER," which is a continuation of, and claims a benefit of priority under 35 U.S.C. § 120 from, U.S. patent application Ser. No. 14/870,986, filed Sep. 30, 2015, issued as U.S. Pat. No. 10,362,146, entitled "METHOD AND SYSTEM FOR ENFORCING GOVERNANCE ACROSS MULTIPLE CONTENT REPOSITORIES USING A CONTENT BROKER," all of which are hereby fully incorporated herein by reference for all purposes.

BACKGROUND

A significant amount of content is stored in content repositories. The access and manipulation of this content is typically limited to pre-defined constructs and/or methods. When attempts are made to modify the pre-defined constructs and/or methods, such attempts require significant resources and time to implement.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for using a content broker for managing access to content stored across different content repositories. More specifically, embodiments of the technology relate to implementing a content broker that is interposed between web applications and the content repositories, where the content broker includes functionality to service various requests (including search requests) for content in any of the connected content repositories and/or to apply governance in a centralized manner for content stored across the various content repositories.

Figure 1:
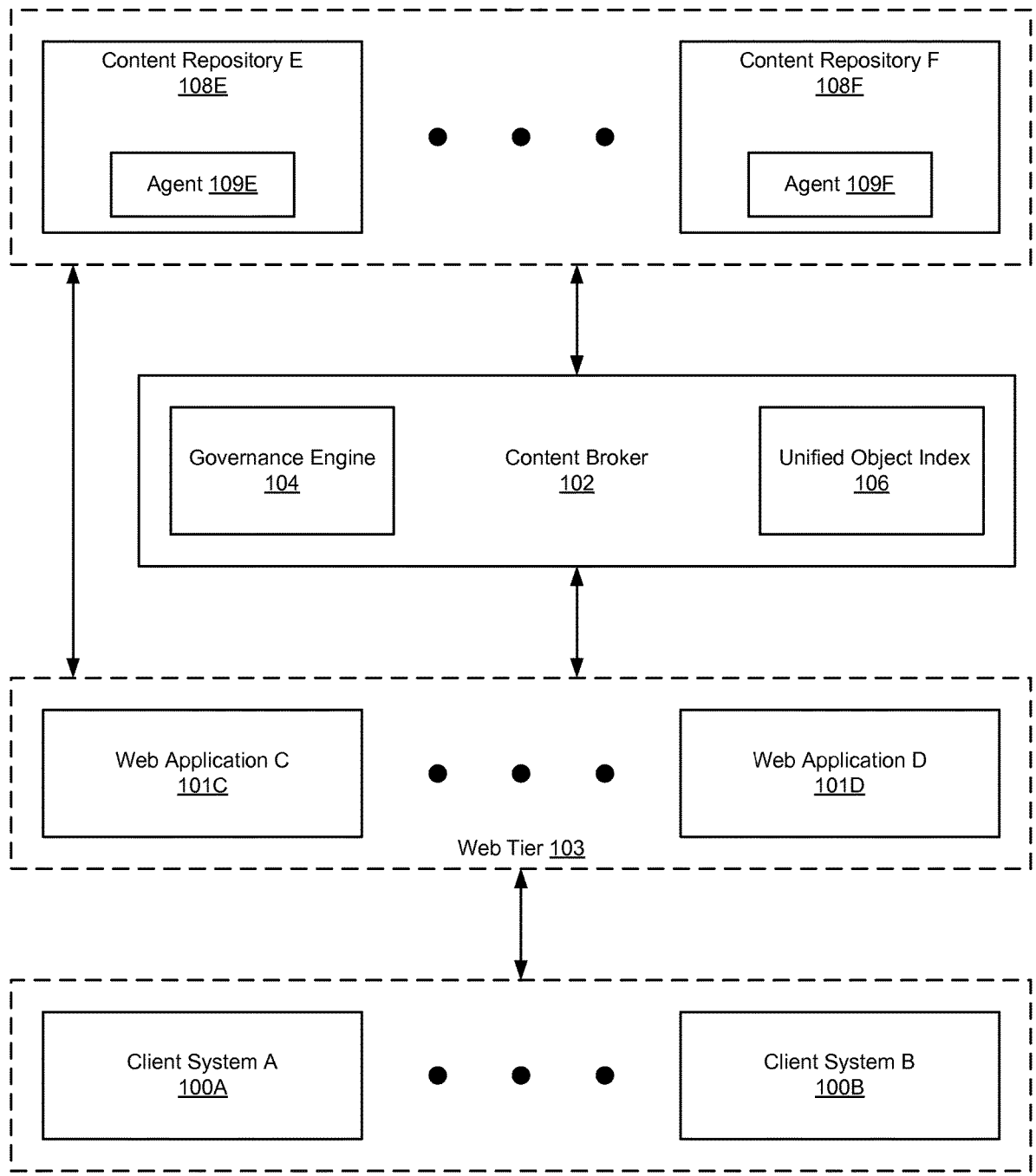
FIG. 1 shows an exemplary system in accordance with one or more embodiments of the technology.

FIG. 1 shows an exemplary system in accordance with one or more embodiments of the technology. The system includes one or more client systems (100A, 100N), a web tier (103) that includes one or more web applications (101C, 101D), a content broker (102), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (also referred to as a client) corresponds to any computing system (see e.g., FIG. 7) that includes functionality to issue requests to one or more web applications (101C, 101D) and to receive a corresponding response(s) from the web application(s) after the request has been serviced.

In one embodiment of the technology, the requests and responses may use Hypertext Transfer Protocol (HTTP). In such scenarios, the client systems may each include at least one web browser (not shown) that permits the client system to display webpages (not shown) (provided with HTTP responses) to users of the client systems. The technology is not limited to the aforementioned protocol.

Continuing with the discussion of FIG. 1, each web application (101C, 101D) may be executing on one or more application servers (not shown), where each application server is a computing system (e.g., a computing system described in FIG. 7) that includes functionality to host a web application. Hosting the web application may include storing the necessary files including source code, images, third party libraries, etc. for and/or associated with the web application and then executing the web application. Executing the web application may include receiving HTTP requests from client systems (100A, 100B), processing the HTTP requests, generating HTTP responses based on the processing of the HTTP requests, and providing the HTTP responses to the client systems.

While FIG. 1 shows web applications, the technology is not limited to client systems interfacing with web applications; rather, the technology may be implemented using any type of client-server architecture, where the client system is remote from the server executing the application (e.g., the application is a cloud-based application).

In one embodiment of the technology, the web applications include functionality to issue requests to the content broker and/or the specific content repositories (108E, 108F). The web application may issue requests to the content broker to perform one or more actions on an object, to perform one or more actions on metadata associated with one or more objects and/or to obtain objects or metadata associated with one or more objects (e.g., via a search request). The requests issued by the web applications may be initiated by a user via a client system or may be initiated by the web application. Additional detail about the servicing of requests by the content broker is described in FIGS. 5-6.

Continuing with the discussion of FIG. 1, web applications may also include functionality to directly obtain objects from the appropriate content repositories once the content broker (via the governance engine (104)) determines that the web application may obtain the object. Additional detail with respect to the web application directly obtaining objects from one or more content repositories is provided below with respect to FIG. 5.

In one embodiment of the technology, the content broker (102) provides an interface between the web applications and the content repositories. The content broker (102) includes functionality to communicate with both the web applications and the content repositories. With respect to communicating with the web applications, the content broker (102) includes functionality to govern the manner in which the web applications interact with objects. More specifically, the content broker includes a governance engine that includes functionality to determine whether a given web application (or client of a web application) may perform particular actions on objects in one or more content repositories. Additional detail about the operation of the governance engine is provided in FIG. 5.

In one embodiment of the technology, the content broker (102) includes functionality to create and maintain a unified object index (106). The unified object index includes a listing of object IDs and corresponding metadata (see e.g., FIG. 2) for all objects that are stored in any of the content repositories that are managed by the content broker. In this manner, the content broker enables the various web applications to access content across all of the managed content repositories. The specific metadata that is stored in the unified object index may vary based on the object type and/or the implementation of the unified object index. In embodiment of the technology, the unified object index includes sufficient metadata to permit the content broker to service search requests (i.e., queries on the metadata) without requiring the content broker to issue requests to the content repositories. The content broker may obtain the object IDs and metadata from agents (109E, 109F) that are located in the content repositories.

Figure 7:
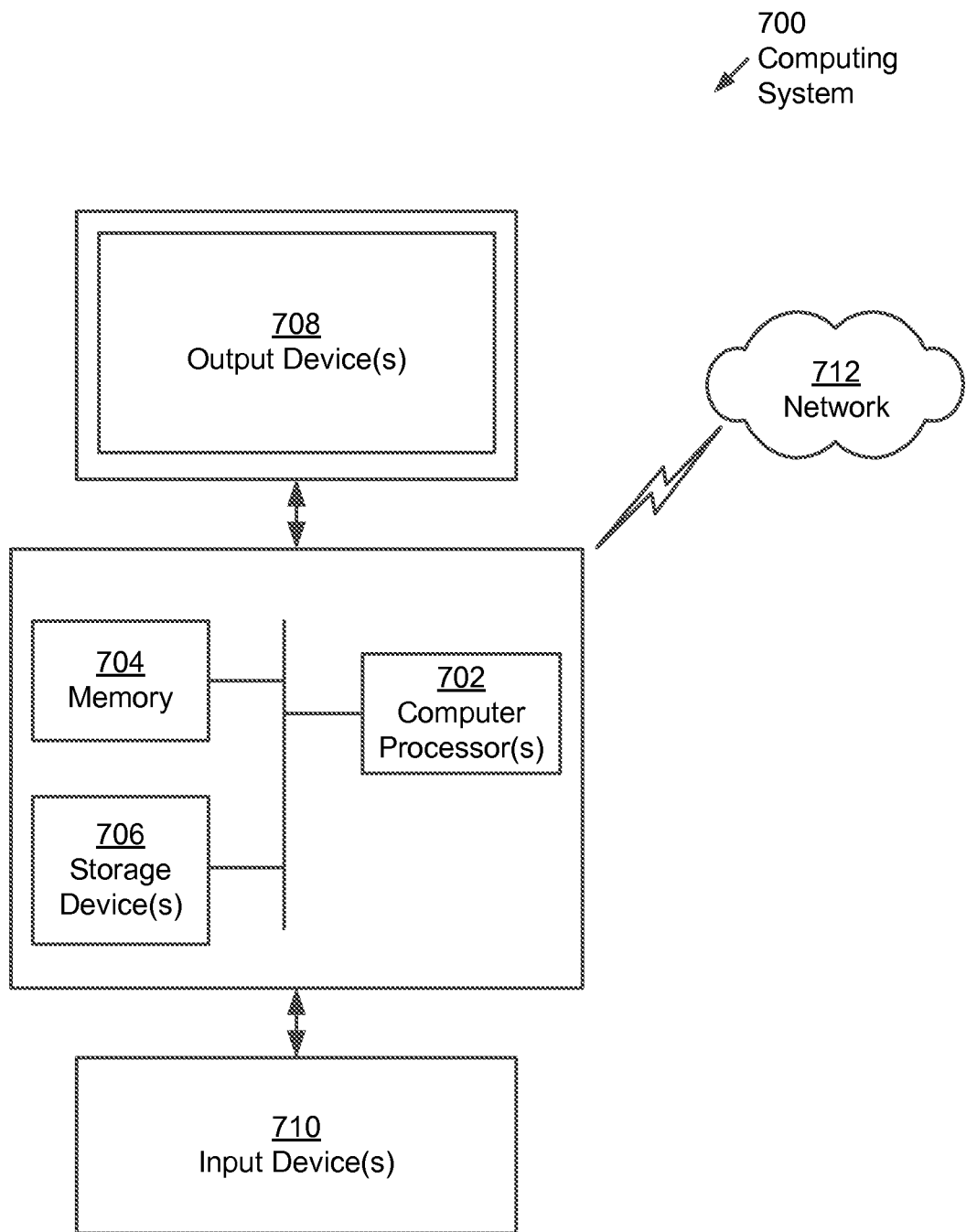
FIG. 7 shows a computing system in accordance with one or more embodiments of the technology.

The content broker may be implemented on one or more computing systems such as the computing system shown in FIG. 7. Further, the unified object index may be implemented using a database management system (or a distributed database management system) along with a corresponding database (or distributed database). In such cases, the database management system (or the distributed database management system) may include functionality to service the search requests.

Figure 5:
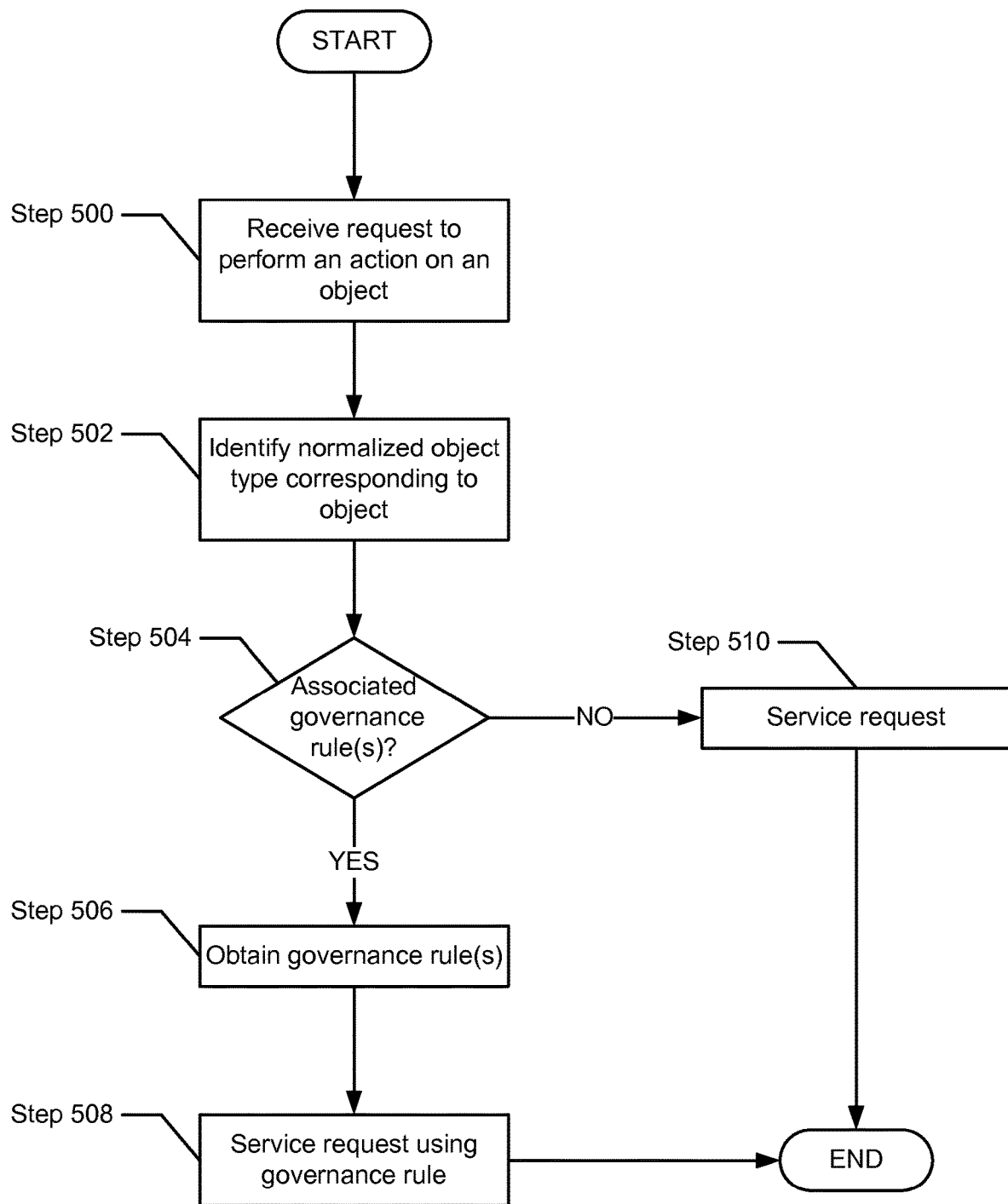
FIG. 5 shows a method for servicing requests in accordance with one or more embodiments of the technology.
Figure 6:
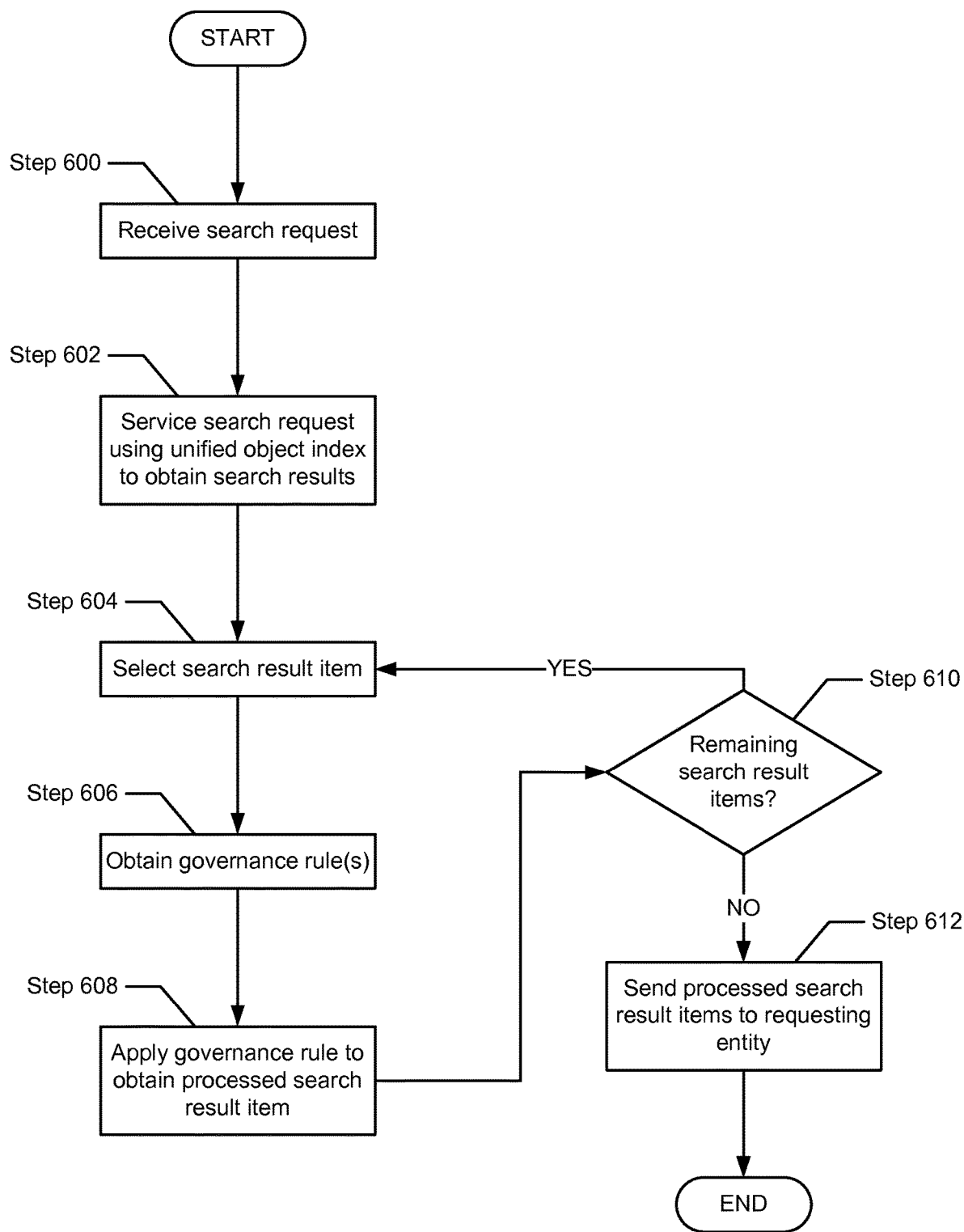
FIG. 6 shows a method for servicing search requests in accordance with one or more embodiments of the technology.

Additional detail about the operation of the content management server is provided in FIGS. 5-6.

In one embodiment of the technology, each content repository (108A, 108M) includes persistent storage (e.g., solid state storage, magnetic storage, optical storage, any other type of persistent storage or any combination thereof) in which objects (see e.g., FIG. 2) are stored.

Continuing with the discussion of the content repositories, each of the content repositories may store objects using any known or subsequently discovered mechanism. The following describes various examples of the mechanisms that may be used to store objects. The examples are not intended to limit the technology. In a first example, the content repository (108E, 108F) may be a set of magnetic hard disks. In a second example, the content repository (108E, 108F) may be implemented using a computer cluster that is executing a distributed file system. In a third example, the content repository (108E, 108F) may be implemented using a network file server and one or more block-storage devices (i.e., as a Storage Area Network).

As discussed above, each content repository that is managed by the content broker (102) includes an agent (109E, 109F). The agent (e.g., an executing application or process) includes functionality to obtain, for each object (or subset of objects) in the content repository, an object ID and metadata for the object. The amount of metadata that is obtained for each object may vary based on the implementation of the technology. The agent may be provided updates to the content broker when: (i) a new object(s) is stored in the content repository; (ii) an object(s) is deleted from the content repository, (iii) when metadata associated with an object(s) has changed (which may include the location of the object in the repository). The agent may provide updates to the content broker at other points in time without departing from the technology.

The technology is not limited to the architecture of the system shown in FIG. 1.

Figure 2:
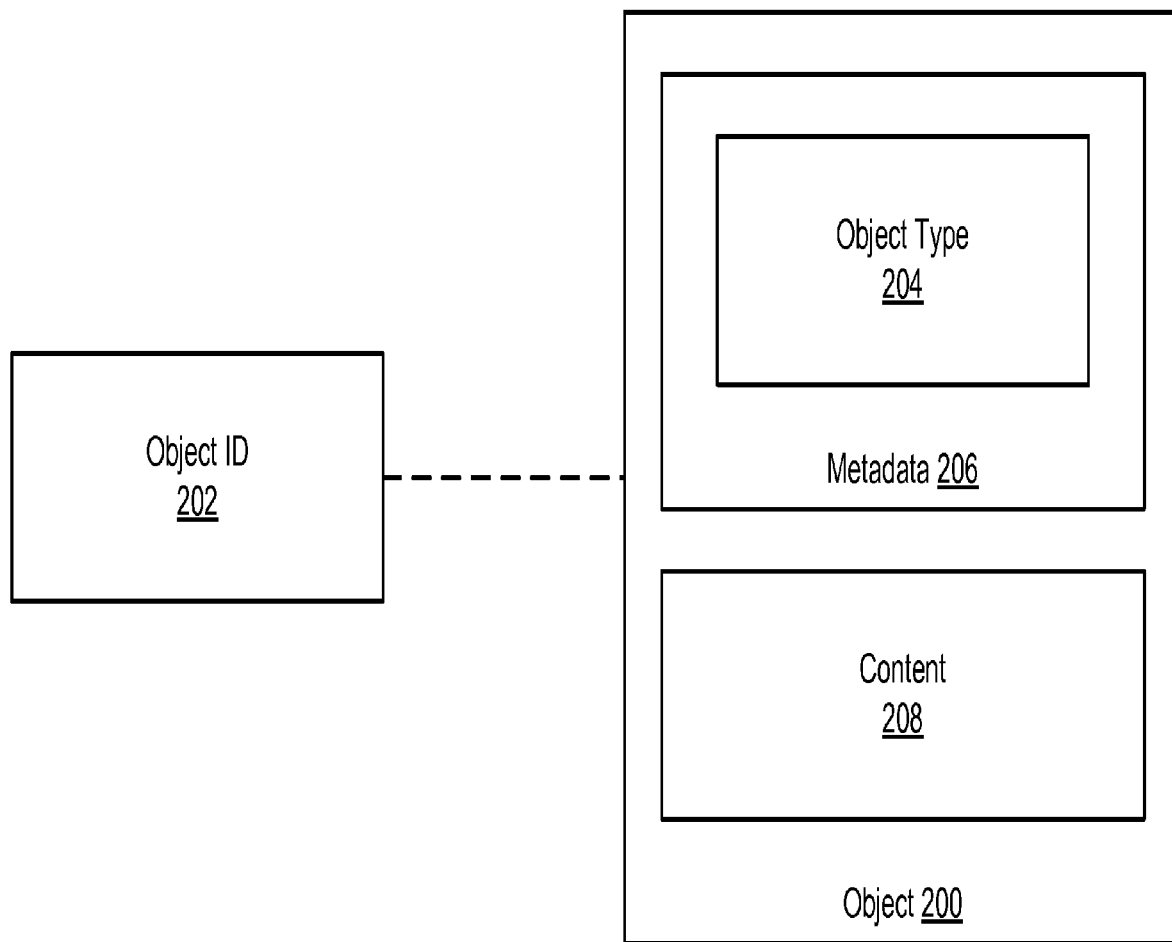
FIG. 2 shows an exemplary object in accordance with one or more embodiments of the technology.

FIG. 2 shows an exemplary object in accordance with one or more embodiments of the technology. The object (200) corresponds to a combination of content (208) and the metadata (206) associated with the content. The metadata (206) may include the object type (204) as well as any other metadata associated with the object. Examples of metadata may include, but are not limited to, author, content name, creation time, creation date, size of object, modification time, modification date, object format (i.e., the format of the content (208), e.g., portable document format (PDF), MPEG-4, .txt, etc.). With respect to the content, the content may correspond to any type of data that may be stored in the content repository. Examples of content may include, but are not limited to, text files, audio files, image files, and/or audio-visual files.

In one embodiment of the technology, each object (200) may be identified using an object ID (202). The object ID uniquely identifies the object in the content repository. The object ID may be any combination of numbers, letters, and symbols.

In one embodiment of the technology, the metadata and content associated with a given object may be stored in a single location. Alternatively, the metadata associated with an object may be stored in a first location and the content associated with a given object may be stored in a second location, where the first and second locations may be in the same or different content repositories.

In one embodiment of the technology, an object type (204) is a user-defined composite datatype that encapsulates a data structure along with the functions and procedures needed to manipulate the data. Accordingly, when an object is specified as being of a given object type, the metadata (206) and the content (208), by default, may only be manipulated in accordance with the functions and procedures specified for the object type. In one embodiment of the technology, each object (200) is associated with a single object type.

In one embodiment of the technology, each content repository may support different object types (i.e., only objects of the supported object type(s) may be stored in the particular content repository). In such scenarios, the object type (204) for an object that is stored in the content repository may be referred to as a content repository type. Accordingly, the content broker may be required to manage objects with a wide range of content object types. In embodiment of the technology, the content broker includes functionality to normalize the object types that are governed by the content broker. Additional detail about the normalization of object types is discussed below with respect to FIG. 4.

Figure 3:
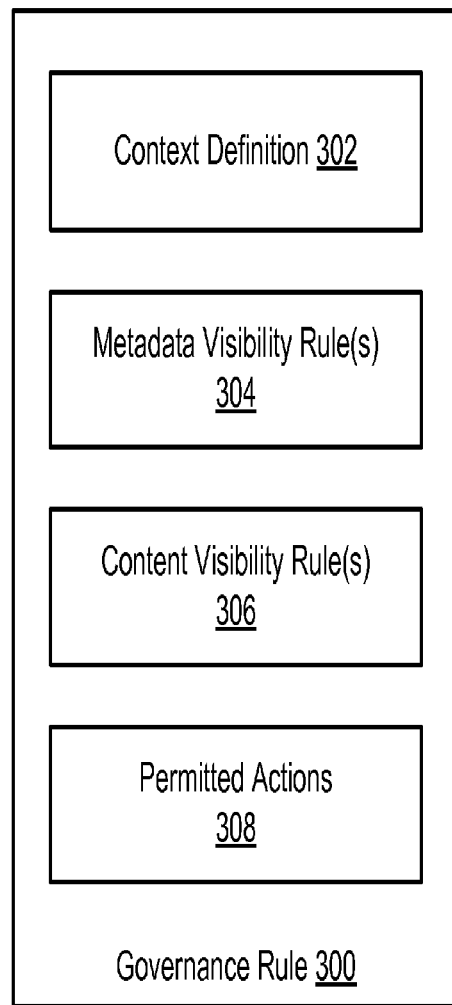
FIG. 3 shows an exemplary governance rule in accordance with one or more embodiments of the technology.

As discussed above, the content broker includes a governance engine that includes functionality to manage the interaction of the web applications with the objects in the content repository. The governance engine may include or have access to one or more governance rules that may be applied to actions requested by the requests that are received from the web applications. FIG. 3 shows an exemplary governance rule in accordance with one or more embodiments of the technology.

Each governance rule (300) includes a context definition (302) and may include one or more of the following: metadata visibility rules (304), content visibility rules (306), and permitted actions (308). Each of the components of the governance rule is described below.

In one embodiment of the technology, the context definition (302) specifies when the governance rule should be applied to service a request. Said another way, the context definition (302) specifies the context associated with the request for which the governance rule applies. In one embodiment of the technology, the context definition may be defined using one or more regular expressions.

The context definition may be specified at any level of granularity. For example, the context definition may specify one or more of the following: (i) the object, e.g., using the object ID or using an expression (e.g., a regular expression) that may be used to identify the object (e.g., if content in the object is an audio-visual file); (ii) the action (or set of actions); (iii) the client system that issued a requests to the web application that, in turn, issued a request to the content broker; (iv) the web application from which a request was issued; and (v) the user that issued the request (i.e., the user that issued the request via the client system). The context definition may specify additional and/or other information without departing from the technology.

Continuing with the discussion of FIG. 3, the governance rule may include metadata visibility rules (304). In one embodiment of the technology, the governance rule may specify which metadata may be visible to the web application when the request is successfully serviced. For example, the metadata visibility rule may specify that when a given request is serviced based on the governance rule only the content name and content format type may be visible to the web application.

Continuing with the discussion of FIG. 3, the governance rule may include content visibility rules (306). In one embodiment of the technology, the governance rule may specify which content may be visible to the web application when the request is successfully serviced. For example, the content visibility rule may specify that when a given request is serviced based on the governance rule that specific portions (e.g., certain pages, certain words, certain sentences that include certain words, etc.) of the content are to be redacted.

Continuing with the discussion of FIG. 3, the governance rule may include permitted actions (308). In one embodiment of the technology, the governance rule may specify: actions that may be performed on an object (regardless of context) and/or (ii) actions that may be performed in the context (as defined by the context definition).

The governance rule may specify additional or other information without departing from the technology.

Figure 4:
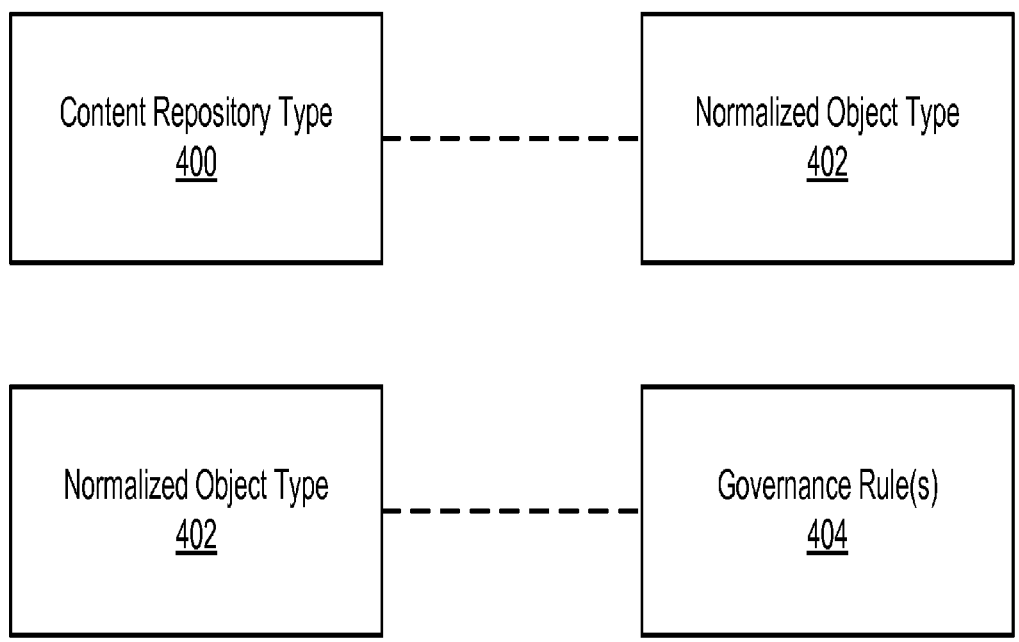
FIG. 4 shows exemplary relationships between various components in accordance with one or more embodiments of the technology.

FIG. 4 shows exemplary relationships between various components in accordance with one or more embodiments of the technology.

As discussed above, each object that is stored in a content repository is associated with a content repository type (i.e., an object type that is supported by the content repository in which it is stored). Accordingly, each content repository type (i.e., a content repository-specific object type) (400) is associated with a normalized object type (402). Accordingly, multiple content repository-specific object types may be mapped to a single normalized object type. For example, one content repository may include a resume object and a second content repository may include an interview evaluation object. Both of these content repository-specific object types may be mapped to a normalized object, e.g., a single job application object. The content broker may maintain a content repository-specific object type to normalized object type mapping. Alternatively, the metadata associated with each object that is indexed in the unified object index may be updated to also include the normalized object type.

The governance engine includes functionality to enforce the governance rules (see e.g., FIG. 3) on a normalized object type basis. Accordingly, each normalized object type may be associated with one or more governance rules (404).

Additional details related to the using the governance rules is described below in FIGS. 5-6.

FIGS. 5-6 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

FIG. 5 shows a method for servicing requests in accordance with one or more embodiments of the technology.

In step 500, a request is received by the content broker from a web application (i.e., a requesting entity). In one embodiment of the technology, the request includes an object ID and an action(s) to be performed on (or with) the object (or a portion thereof) associated with the object ID. The request may include additional information (e.g., parameters associated with the action) without departing from the technology. The action may correspond to any action that may be performed on any portion of the object (i.e., on the content or metadata, see e.g., FIG. 2). Examples of actions may include, but are not limited to, read, write, modify, delete, and move. In one embodiment of the technology, the request may include specify a set of objects using, e.g., object IDs or a regular expression.

In the event that the request specifies multiple objects and/or multiple actions, steps 502-510 may be performed for every <object ID, action> pair.

In one embodiment of the technology, the request is sent via a Representational State Transfer (REST) application programming interface (API).

In step 502, the normalized object type for the object (i.e., the object corresponding to the object ID) is obtained. More specifically, in one embodiment of the technology, the unified object index may be queried in order to obtain the object type for the object. In this embodiment, the object ID may be used to identify the content repository type from the unified object index. The content broker may then determine the normalized object type corresponding to the content repository-specific object type. In another embodiment of the technology, the metadata associated with the object in the unified object index may be modified (at some point prior to step 502) to include the normalized object type. In such cases, the object ID may be used to directly obtain the normalized object type.

In step 504, a determination is made about whether there are zero, one or more governance rules associated with the normalized object type. If one or more governance rules are identified, then the process proceeds to step 506; otherwise, the process proceeds to step 510.

In one embodiment of the technology, the determination in step 504 includes evaluating context definition of each of the governance rules to determine all governance rules in which the content of the request (described above) matches the context definition in the governance rule. In one embodiment of the technology, if there are no governance rules that include context definitions that match the context of the request, then a default governance rule may be used to service the request.

In step 506, the one or more governance rules are obtained by the governance engine.

In step 508, the request is serviced using the one or more governance rules identified in step 504. The result(s) of service the request is then sent to the requesting entity. In one embodiment of the technology, servicing the request may include: (i) determining whether the action in the request is permitted to be performed on the object based on the permitted action portion of the identified governance rule(s); (ii) if the action can be performed on the object, then the action is performed on the object in accordance with any content visibility rules and metadata visibility rules specified in the governance rule.

In one embodiment of the technology, while the governance rule may require that the metadata and/or content is modified prior to it being provided to the requesting entity, the actual metadata and content may not be modified; rather, a copy of the metadata and/or content to be modified is created and the copy of the metadata and/or content is modified (per the governance rule).

In one embodiment of the technology, the servicing of the request in step 508 may result additional objects being obtained (i.e., an object that is not identified in the request obtained in step 500). In such cases, any of the additional objects may be processed in accordance with FIG. 5 or may be processed using the same governance rules as determined in step 504. Further, any of the additional objects that are not associated with any governance rules may be serviced in accordance with step 510.

Returning back to Step 504, if there are no matching governance rules, then the process proceeds to step 510. In step 510, the request has been serviced without the execution of any governance rules. The result of servicing the request (i.e., the action is ultimately performed or the action is not performed) is provided to the requesting entity.

In one embodiment of the technology, if the action specifies reading of an object, then servicing the read request may include: (i) sending, by the content broker, a request for a unique URL to content repository in which the object is located; (ii) receiving, from the content repository, the unique URL for the object by the content broker; (iii) providing the unique URL to the web application. The web application may then use the unique URL to directly connect to the aforementioned content repository and obtain the object. In this scenario, the content broker does not obtain a copy of the object.

Alternatively, servicing the read request may include: (i) sending, by the content broker, a request for the object; (ii) receiving, by the content broker, the object from the content repository; (iii) providing, by the content broker, the object to the web application. In this scenario, the content broker may also include functionality to cache the object and then provide the cached object in response to subsequent read requests.

FIG. 6 shows a method for servicing search requests in accordance with one or more embodiments of the technology.

In step 600, a search request is received. The search request may specify one or more values that may be used to identify zero, one or more objects. The search request may be in written in a query language or the search request may be a natural language search request. The search request may take other forms without departing from the technology. In one embodiment of the technology, the search request is sent via a Representational State Transfer (REST) application programming interface (API).

In step 602, content broker executes the search request in order to identify one or more objects (represented by object IDs) in the unified query index. Execution of the search request may include identifying one or more objects whose metadata (a copy of which is present in the unified object index) (or a portion thereof) matches one or more values in the search request.

The result of the execution of the search request is a zero, one or more search result items, where each search result item includes an object ID and all or a portion of the metadata associated with the object (i.e., the object associated with the object ID). In one embodiment of the technology, the metadata associated with the search item is obtained from the unified object index. If there are no search result items, then the process ends. Otherwise, the process proceeds to step 604.

In step 604, a search result item from the set of search result items obtained in step 602 is selected for processing.

In step 606, one or more governance rules associated with the search result item is obtained. The one or more governances rules may be obtained in same (or in a similar) manner as described in steps 504 and 506.

In step 608, the governance rules identified in step 606 are applied to the search result item. In one embodiment of the technology, applying the governance rule may include processing the search result item in accordance with any metadata visibility rules specified in the governance rule(s).

If there are no governance rules that apply to the search result item, then the steps 606 and 608 may not be performed for that particular search result item.

In step 610, a determination is made about whether there are any other search result items to process. If there are no other search result items to process, the method proceeds to step 612; otherwise, the method proceeds to step 604.

In step 612, the processed search result items are provided to the requesting entity (e.g., the web application that issued the request in step 600). Step 612 may also include providing search results items for which no governance rule was applicable and, thus, no governance rule was applied.

In one embodiment of the technology, the content broker includes functionality to track all requests received and/or serviced by the content broker and what (if any) governance rules were used to service the requests. This tracking functionality provides a central location from which to audit the manner in which the web applications are interacting with the objects in the content repositories to ensure that this interaction is in compliance with the relevant laws, rules, and regulations.

Embodiments of the technology provide a single point from which web applications can access multiple distinct content repositories. Further, embodiments of the technology provide a unified governance layer that operates between the web application and the content repositories thereby alleviating the web applications from implementing a governance layer. Moreover, the use of normalized object types allows the content broker to uniformly manage objects that have different content repository-specific object types.

Embodiments of the technology also provide cross-content repository search and index functionality through the use of agents to obtain object metadata for the content broker. In this manner, the content broker is able to create and maintain a unified object index across all managed content repositories, thereby permitting the web applications to issue a single search request to the content broker and identify matching objects stored in different content repositories.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method, comprising:
    receiving, by a computer, a request from a user device to perform an action on an object stored in a content repository, the action corresponding to any action applicable to any portion of the object;
    identifying, by the computer, a normalized object type for the object;
    determining, by the computer, whether there are any governance rules associated with the normalized object type and wherein the determining comprises:
        evaluating a context definition of each of a plurality of governance rules; and
        determining whether the context definition matches the request;
    responsive to no governance rule being associated with the normalized object type, servicing the request utilizing a default governance rule; and
    responsive to a governance rule being associated with the normalized object type, servicing the request utilizing the governance rule associated with the normalized object type, wherein the servicing the request comprises:
        determining, based on the governance rule, whether the action is permitted to be performed on the object; and
        responsive to the action being permitted to be performed on the object, performing the action on the object in accordance with any content visibility rules and metadata visibility rules specified in the governance rule.

2. The method according to claim 1, wherein the governance rule requires modification of metadata for the object, content of the object, or a combination thereof.

3. The method according to claim 2, further comprising:
creating a copy of the metadata for the object, a copy of the content of the object, or both; and
modifying the copy of the metadata for the object, the copy of the content of the object, or both so that the content stored in the repository is not modified.

4. The method according to claim 1, wherein the servicing the request comprises:
obtaining an additional object not identified in the request; and
processing the additional object utilizing the governance rule associated with the normalized object type.

5. The method according to claim 1, wherein the servicing the request comprises managing interaction between an application on the user device and the object stored in the content repository based on the governance rule.

6. The method according to claim 1, wherein the request contains an object identification (ID) for the object and wherein the normalized object type for the object is identified utilizing the object ID.

7. A system, comprising:
a processor;
a non-transitory computer-readable medium; and
instructions stored on the non-transitory computer-readable medium and translatable by the processor for:
receiving a request from a user device to perform an action on an object stored in a content repository, the action corresponding to any action applicable to any portion of the object;
identifying a normalized object type for the object;
determining whether there are any governance rules associated with the normalized object type and wherein the determining comprises:
evaluating a context definition of each of a plurality of governance rules; and
determining whether the context definition matches the request;
responsive to no governance rule being associated with the normalized object type, servicing the request utilizing a default governance rule; and
responsive to a governance rule being associated with the normalized object type, servicing the request utilizing the governance rule associated with the normalized object type, wherein the servicing the request comprises:
determining, based on the governance rule, whether the action is permitted to be performed on the object; and
responsive to the action being permitted to be performed on the object, performing the action on the object in accordance with any content visibility rules and metadata visibility rules specified in the governance rule.

8. The system of claim 7, wherein the governance rule requires modification of metadata for the object, content of the object, or a combination thereof.

9. The system of claim 8, wherein the instructions are further translatable by the processor for:
creating a copy of the metadata for the object, a copy of the content of the object, or both; and
modifying the copy of the metadata for the object, the copy of the content of the object, or both so that the content stored in the repository is not modified.

10. The system of claim 7, wherein the servicing the request comprises:
obtaining an additional object not identified in the request; and
processing the additional object utilizing the governance rule associated with the normalized object type.

11. The system of claim 7, wherein the servicing the request comprises managing interaction between an application on the user device and the object stored in the content repository based on the governance rule.

12. The system of claim 7, wherein the request contains an object identification (ID) for the object and wherein the normalized object type for the object is identified utilizing the object ID.

13. A computer program product comprising a non-transitory computer-readable medium storing instructions translatable by a processor for:
receiving a request from a user device to perform an action on an object stored in a content repository, the action corresponding to any action applicable to any portion of the object;
identifying a normalized object type for the object;
determining whether there are any governance rules associated with the normalized object type and wherein the determining comprises:
evaluating a context definition of each of a plurality of governance rules; and
determining whether the context definition matches the request;
responsive to no governance rule being associated with the normalized object type, servicing the request utilizing a default governance rule; and
responsive to a governance rule being associated with the normalized object type, servicing the request utilizing the governance rule associated with the normalized object type, wherein the servicing the request comprises:
determining, based on the governance rule, whether the action is permitted to be performed on the object; and
responsive to the action being permitted to be performed on the object, performing the action on the object in accordance with any content visibility rules and metadata visibility rules specified in the governance rule.

14. The computer program product of claim 13, wherein the governance rule requires modification of metadata for the object, content of the object, or a combination thereof.

15. The computer program product of claim 14, wherein the instructions are further translatable by the processor for:
creating a copy of the metadata for the object, a copy of the content of the object, or both; and
modifying the copy of the metadata for the object, the copy of the content of the object, or both so that the content stored in the repository is not modified.

16. The computer program product of claim 13, wherein the servicing the request comprises:
obtaining an additional object not identified in the request; and
processing the additional object utilizing the governance rule associated with the normalized object type.

17. The computer program product of claim 13, wherein the servicing the request comprises managing interaction between an application on the user device and the object stored in the content repository based on the governance rule.

* * * * *